United States Patent
Mishra et al.

(10) Patent No.: US 9,874,686 B2
(45) Date of Patent: Jan. 23, 2018

(54) OPTICAL FIBER WITH MACROBEND LOSS MITIGATING LAYER

(71) Applicant: Corning Incorporated, Corning, NY (US)

(72) Inventors: Snigdharaj Kumar Mishra, Wilmington, NC (US); Michal Mlejnek, Big Flats, NY (US); James Andrew West, Painted Post, NY (US); William Allen Wood, Painted Post, NY (US); Aramais Robert Zakharian, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 15/166,772

(22) Filed: May 27, 2016

(65) Prior Publication Data
US 2017/0017032 A1 Jan. 19, 2017

Related U.S. Application Data

(60) Provisional application No. 62/168,136, filed on May 29, 2015.

(51) Int. Cl.
*G02B 6/02* (2006.01)
*G02B 6/036* (2006.01)
*G02B 6/028* (2006.01)

(52) U.S. Cl.
CPC ..... *G02B 6/03655* (2013.01); *G02B 6/02019* (2013.01); *G02B 6/0281* (2013.01); *G02B 6/02395* (2013.01); *G02B 6/03683* (2013.01)

(58) Field of Classification Search
None
See application file for complete search history.

(56) References Cited

U.S. PATENT DOCUMENTS

| | | | | |
|---|---|---|---|---|
| 4,641,917 A | * | 2/1987 | Glodis | G02B 6/02047 385/127 |
| 5,032,001 A | * | 7/1991 | Shang | G02B 6/03655 385/124 |

(Continued)

OTHER PUBLICATIONS

Jeunhomme, "Single Mode Fiber Optics,", pp. 39-44, Marcel Dekker, New York, 1990.

(Continued)

*Primary Examiner* — Mike Stahl
(74) *Attorney, Agent, or Firm* — Svetlana Z. Short

(57) ABSTRACT

An optical fiber comprising: (i) a core comprising silica and having a maximum relative refractive index delta $\Delta_{1MAX}$; and LP01 effective area $>100$ μm² at 1550 nm;
(ii) an inner cladding surrounding the core and having a minimum relative refractive index delta $\Delta_{2MIN}$ and $\Delta_{coreMAX} > \Delta_{2MIN}$; (iii) an outer cladding surrounding the inner cladding and comprising a first outer cladding portion with a maximum refractive index $\Delta_{3A}$ such that $\Delta_{3A} > \Delta_{2MIN}$; and another outer cladding portion surrounding the first outer cladding portion with a maximum refractive index delta $\Delta_{3B}$ wherein with a maximum refractive index delta $\Delta_{3B}$ wherein $\Delta_{3B} > \Delta_{3A}$, said another portion being the outermost portion of the outer cladding; and (iv) a coating layer surrounding the outer cladding, and in contact with said another outer cladding portion, the coating layer having a relative refractive index delta $\Delta_C$ wherein $\Delta_C > \Delta_{3B}$.

21 Claims, 8 Drawing Sheets

(56) References Cited

U.S. PATENT DOCUMENTS

| | | | |
|---|---|---|---|
| 6,118,575 | A | 9/2000 | Grubb et al. |
| 6,326,416 | B1 | 12/2001 | Chien et al. |
| 6,531,522 | B1 | 3/2003 | Winningham |
| 6,539,152 | B1 | 3/2003 | Fewkes et al. |
| 6,563,996 | B1 | 5/2003 | Winningham |
| 6,869,971 | B1 | 3/2005 | Akama et al. |
| 7,010,206 | B1 | 3/2006 | Baker et al. |
| 7,221,842 | B2 | 3/2007 | Baker et al. |
| 7,423,105 | B2 | 9/2008 | Winningham |
| 7,437,045 | B2 | 10/2008 | Prasad et al. |
| 8,204,349 | B2 | 6/2012 | Gapontsev et al. |
| 8,849,084 | B2 | 9/2014 | Yang et al. |
| 9,052,435 | B2 | 6/2015 | Zhang et al. |
| 2008/0285929 | A1* | 11/2008 | Shimotakahara .. G02B 6/03655 385/127 |
| 2013/0230290 | A1 | 9/2013 | Evans et al. |
| 2016/0109651 | A1* | 4/2016 | Borel ................ C03B 37/01446 385/128 |

OTHER PUBLICATIONS

Harris et al. "Bend Loss Measurements on High Numerical Aperture Single-mode fibers as a function of wavelength and bend radius", Journal of Lightwave Technology LT-4(1) p. 34-40 (1986).

Renner, "Bending losses of coated single-mode fibers: a simple approach", Journal of Lightwave Technology 10(5) p. 544-551 (1992).

Valiente et al. "New formalism for bending losses in coated single-mode optical fibres", Electonics Letters25(22) p. 1544-1555 (1989).

Schermer et al., "Imrpoved bend loss formula verified for optical fiber by simulation and experiment" IEEE J. Quant. El. 43(10) p. 899-909 (2007).

\* cited by examiner

OPTICAL FIBER WITH MACROBEND LOSS MITIGATING LAYER

This application claims the benefit of priority under 35 U.S.C. § 119 of U.S. Provisional Application Ser. No. 62/168,136 filed on May 29, 2015, the content of which is relied upon and incorporated herein by reference in its entirety.

BACKGROUND

Field

The present disclosure relates generally to optical fibers, and particularly to with low macrobend loss optical fibers.

Technical Background

Glass optical fibers with low attenuation have recently been of significant interest in the telecommunications field. In many optical fibers designed for telecommunications the maximum bend loss at the peak of one of the oscillations can occur in the range of bend diameters of interest, e.g., near the bend diameter prescribed by standards specification, or in the window of bend diameters expected during the deployment. Furthermore, manufacturing process variations that introduce changes in the index profile of the drawn fiber can have a negative impact on the macrobend loss performance. Techniques for improving macrobend properties can play important roles in many types of fibers, including transmission fibers used in long distance applications, multimode fibers used in the emerging area of fiber to the home applications, and dispersion compensation fibers where bending loss has limited many designs from practical use. One technique for minimizing the macrobend loss is by introducing a low refractive index trench (or moat) directly adjacent to and in contact with the fiber core. This can minimize bend loss variability due to shifting bend loss peaks. However, for large effective mode area fibers (fibers with effective areas>100 $\mu m^2$) this approach is difficult or impractical to apply, because the fiber profile designs that reduce bend loss via the low index trench situated adjacent to the fiber core also usually lead to a longer cutoff wavelength, which often conflicts with the requirements for shorter cabled cutoff wavelength.

SUMMARY

According to one or more embodiments shown and described herein an optical fiber includes: (i) a core comprising silica and having a maximum relative refractive index delta $\Delta_{coreMAX}$; and $LP_{01}$ effective area>100 $\mu m^2$ at 1550 nm; (ii) an inner cladding surrounding the core and having a minimum relative refractive index delta $\Delta_{2MIN}$, and $\Delta_{coreMAX}>\Delta_{2\ MIN}$; (iii) an outer cladding surrounding the inner cladding and comprising (a) a first outer cladding portion with a maximum refractive index $\Delta_{3A}$, such that $\Delta_{3A}>\Delta_{2MIN}$, and (b) second outer cladding portion surrounding and in contact with the first outer cladding portion, the second outer cladding portion having a maximum refractive index delta $\Delta_{3B}$ wherein $\Delta_{3B}>\Delta_{3A}$, the second cladding outer portion being the outermost portion the outer cladding; (iv) a coating layer surrounding and in contact with the second outer cladding portion, the coating layer having a relative refractive index delta $\Delta_C$ and $\Delta_C>\Delta_{3B}$. That is, $\Delta_C>\Delta_{3B}>\Delta_{3A}$. In at least some embodiments $\Delta_C>\Delta_{coreMAX}$.

In some embodiments the inner cladding has a minimum relative refractive index delta where $-0.7\%<\Delta_{2MIN}<-0.2\%$, for example $-0.55\%<\Delta_{2MIN}<-0.35\%$. In some embodiments, the maximum refractive index $\Delta_{3A}$ of the second outer cladding portion is $\Delta_{3A}\geq-0.07\%$. In some embodiments $\Delta_{3A}-\Delta_{2MIN}\geq0.02\%$, and $0.8\%\geq\Delta_C-\Delta_{3B}\geq0.5\%$. In some embodiments $0.06\%\geq\Delta_{3A}-\Delta_{2MIN}\geq0.02\%$. In some embodiments $\Delta_{3B}-\Delta_{3A}\geq0.07\%$. In some embodiments $0.12\%\geq\Delta_{3A}-\Delta_{2MIN}\geq0.03\%$, for example $0.1\%\geq\Delta_{3A}-\Delta_{2MIN}\geq0.05\%$. In some embodiments $-0.35\%\geq\Delta_{2MIN}\geq-0.25\%$. In some embodiments $\Delta_{3A}\geq0.025\%$, and, and in some embodiments $3\%\geq\Delta_C-\Delta_{3B}\geq0.02\%$, for example $2.2\%\geq\Delta_C-\Delta_{3B}\geq0.02\%$. In some embodiments $1.5\%\geq\Delta_C-\Delta_{3B}\geq0.5\%$. In some embodiments $0.9\%\geq\Delta_C-\Delta_{3B}\geq0.6\%$. In some embodiments $0.9\%\geq\Delta_C-\Delta_{3B}\geq0.05\%$. In some embodiments $0.85\%\geq\Delta_C-\Delta_{3B}\geq0.06\%$. In some embodiments $1.0\%\geq\Delta_{3B}-\Delta_{3A}\geq0.05\%$.

In some embodiments $-0.55\%<\Delta_{2MIN}<-0.35\%$ and $0.9\%\geq\Delta_C-\Delta_{3B}\geq0.6\%$ and the coated fiber has macrobend loss <0.03 dB/turn at 50 mm bend diameter, macrobend loss <0.003 dB/turn at 60 mm bend diameter, and macrobend loss of less than 0.001 dB/turn at 75 mm bend diameter.

In some embodiments the inner cladding portion is in contact with the core, $0.7\%<\Delta_{2MIN}<-0.2\%$, $2.2\%\geq\Delta_C-\Delta_{3B}\geq0.02\%$, and the fiber has macrobend loss <0.03 dB/turn at 50 mm bend diameter, macrobend loss<0.003 dB/turn at 60 mm bend diameter, and macrobend loss of <0.001 dB/turn at 75 mm bend diameter.

According to some embodiments an optical fiber comprises:

(i) a core comprising silica and having a maximum relative refractive index delta $\Delta_{coreMAX}$; and LP01 effective area >100 $\mu m^2$ at 1550 nm;

(ii) an inner cladding surrounding the core and having a minimum relative refractive index delta $\Delta_{2MIN}$ and $\Delta_{coreMAX}>\Delta_{2MIN}$, wherein $-0.7\%\leq\Delta_{2MIN}\leq-0.2\%$, measured relative to pure silica;

(iii) an outer cladding surrounding the inner cladding and comprising (a) a first outer cladding portion with a maximum refractive index $\Delta_{3A}$ such that $\Delta_{3A}-\Delta_{2MIN}\geq0.02\%$; and (b) another outer cladding portion surrounding the first outer cladding portion, and having a maximum refractive index delta $\Delta_{3B}$, wherein $\Delta_{3B}-\Delta_{3A}\geq0.07\%$, said another outer cladding portion being the outermost portion of the outer cladding; and (iv) a coating layer surrounding the outer cladding, and in contact with said another outer cladding portion, the coating layer having a relative refractive index delta $\Delta_C$ wherein $\Delta_C>\Delta_{3B}$. According to some embodiments the inner cladding is adjacent to the core and is in contact with the core, the first outer cladding portion is situated in contact with the inner cladding, and the outer cladding portion with the refractive index delta $\Delta_{3B}$ is a second outer cladding portion and is situated in contact with both the coating and the first outer cladding portion.

According to some embodiments the fiber core is Ge free and has a maximum relative refractive index, $\Delta_{coreMAX}$, from between −0.05% and 0.5%. According to some embodiments the optical fiber is a single mode optical fiber has cable cutoff wavelength <153 0 nm. According to some embodiments the optical fiber is a single mode optical fiber and has dispersion less than or equal to about 23 ps/nm·km at a wavelength of 1550 nm.

Additional features and advantages of embodiments will be set forth in the detailed description which follows, and in part will be readily apparent to those skilled in the art from that description or recognized by practicing embodiments as described herein, including the detailed description which follows, the claims, as well as the appended drawings.

It is to be understood that both the foregoing general description and the following detailed description present embodiments, and are intended to provide an overview or framework for understanding the nature and character of embodiments as they are claimed. The accompanying drawings are included to provide a further understanding of embodiments, and are incorporated into and constitute a part of this specification. The drawings illustrate various embodiments, and together with the description serve to explain the principles and operations of embodiments.

DETAILED DESCRIPTION

Figure 1A:
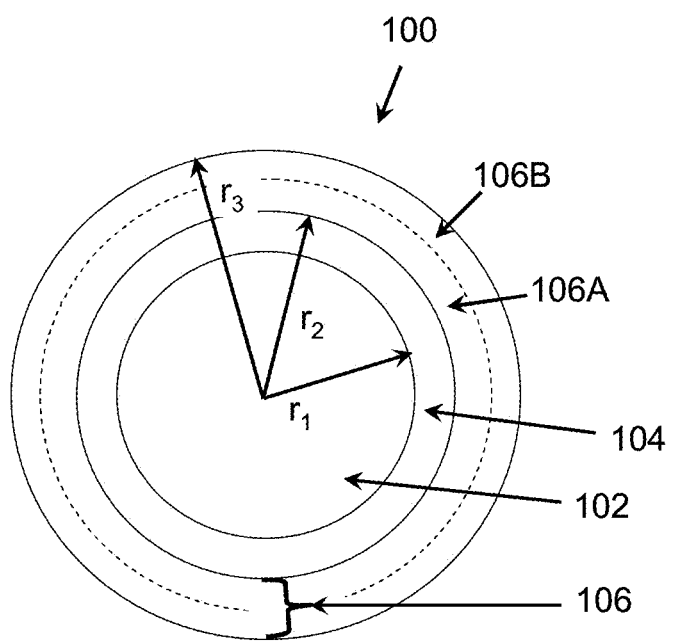
FIG. 1A is a schematic cross sectional view of an optical fiber according to one or more embodiments shown and described herein.

FIG. 1A schematically depicts a cross section of an optical fiber 100 according to one or more embodiments shown and described herein.

According to at least some embodiments described herein an optical fiber 100 includes: (i) a silica based core with a maximum relative refractive index delta $\Delta_{coreMAX}$; and LP01 effective area >100 μm² at 1550 nm; (ii) an inner cladding surrounding the core and having a minimum relative refractive index delta $\Delta_{2MIN}$ such that $\Delta_{coreMAX} > \Delta_{2MIN}$; (iii) an outer cladding surrounding the inner cladding and comprising (a) a first outer cladding portion with a maximum refractive index $\Delta_{3A}$, such that $\Delta_{3A} > \Delta_{2MIN}$, and (b) another outer cladding portion with a maximum refractive index delta $\Delta_{3B}$ wherein $\Delta_{3B} > \Delta_{3A}$ surrounding the first outer cladding portion, this another outer cladding portion being the outermost portion of the outer cladding; (iv) a coating layer surrounding the outer cladding, and in contact with this another outer cladding portion, the coating layer having a relative refractive index delta $\Delta_C$ wherein $\Delta_C > \Delta_{3B}$.

According to some embodiments $\Delta_C \geq \Delta_{coreMAX}$. In some embodiments 2.2% ≥ $\Delta_C - \Delta_{3B}$ ≥ 0.02%, for example 1.5% ≥ $\Delta_C - \Delta_{3B}$ ≥ 0.5%, or 0.9% ≥ $\Delta_C - \Delta_{3B}$ ≥ 0.5%, or 0.85% ≥ $\Delta_C - \Delta_{3B}$ ≥ 0.6%. In some embodiments 1.0% ≥ $\Delta_{3B} - \Delta_{3A}$ ≥ 0.05%. In some embodiments $\Delta_{3A} - \Delta_{2MIN}$ > 0.05%.

According to at least some embodiments described herein an optical fiber 100 includes: (i) a core comprising silica and having a maximum relative refractive index delta $\Delta_{1MAX}$; and LP01 effective area >100 μm² at 1550 nm; (ii) an inner cladding surrounding the core and having a minimum relative refractive index delta $\Delta_{2MIN}$, and $\Delta_{coreMAX} > \Delta_{2MIN}$; (iii) an outer cladding surrounding the inner cladding and comprising (a) a first outer cladding portion with a maximum refractive index $\Delta_{3A}$, such that $\Delta_{3A} > \Delta_{2MIN}$, and (b) second outer cladding portion surrounding and in contact with the first outer cladding portion, the second outer cladding portion having a maximum refractive index delta $\Delta_{3B}$ wherein $\Delta_{3B} > \Delta_{3A}$, the second cladding outer portion being the outermost portion the outer cladding; (iv) a coating layer surrounding and in contact with the second outer cladding portion, the coating layer having a relative refractive index delta $\Delta_C$ wherein $\Delta_C > \Delta_{3B}$. That is, $\Delta_C > \Delta_{3B} > \Delta_{3A}$ According to some embodiments $\Delta_C \geq \Delta_{coreMAX}$. In some embodiments 0.9% ≥ $\Delta_C - \Delta_{3B}$ ≥ 0.5%, and in some embodiments 0.85% ≥ $\Delta_C - \Delta_{3B}$ ≥ 0.6%.

In some embodiments −0.7% < $\Delta_{2MIN}$ < −0.2%. In some embodiments $\Delta_{3A}$ ≥ −0.07%. In some embodiments $\Delta_{3A} - \Delta_{2MIN}$ ≥ 0.02%, and 0.8% ≥ $\Delta_C - \Delta_{3B}$ ≥ 0.5%. In some embodiments −0.55% < $\Delta_{2MIN}$ < −0.35%. In some embodiments −0.55% < $\Delta_{2MIN}$ < −0.35%. In some embodiments −0.55% < $\Delta_{2MIN}$ < −0.35%. In some embodiments −0.05% > $\Delta_{3A}$ ≥ 0.08?%, and $\Delta_{3A} - \Delta_{2MIN}$ ≥ 0.025%, and in some embodiments 3% ≥ $\Delta_C - \Delta_{3B}$ ≥ 0.02% (e.g., 2.2% ≥ $\Delta_C - \Delta_{3B}$ ≥ 0.02%, or 0.9% ≥ $\Delta_C - \Delta_{3B}$ ≥ 0.06%, or 1.5% ≥ $\Delta_C - \Delta_{3B}$ ≥ 0.5%). In some embodiments −0.55 < $\Delta_2$ < −0.35% and 0.7% ≥ $\Delta_C - \Delta_{3B}$ ≥ 0.6% and, the coated fiber has macrobend loss <0.03 dB/turn at 50 mm bend diameter, macrobend loss <0.003 dB/turn at 60 mm bend diameter, and macrobend loss of <0.001 dB/turn at 75 mm bend diameter.

The "refractive index profile," as used herein, is the relationship between refractive index or relative refractive index and fiber radius of a radial cross section of the optical fiber "Relative refractive index," or "relative refractive index delta" as used herein, is defined as:

$$\Delta_i \% = 100 \times \frac{(n_i^2 - n_{ref}^2)}{2n_i^2}$$

where $n_i$ is the maximum refractive index in region i, unless otherwise specified, and $n_{ref}$ is the refractive index of pure silica glass, unless otherwise specified. Accordingly, as used herein, the relative refractive index percent is relative to pure silica glass. The terms delta, delta index, delta index percent, Δ, Δ% are used interchangeably herein.

More specifically, as used herein, $\Delta_{coreMAX}$ refers to the maximum relative refractive index of a core 102 of the optical fiber, $\Delta_{2MIN}$ refers to the minimum relative refractive index of the inner cladding of the optical fiber, $\Delta_{3A}$ refers to the maximum relative refractive index of the first outer cladding portion 106A of the optical fiber and $\Delta_{3B}$ refers to the maximum relative refractive index of the outer most cladding portion 106B of the optical fiber. In some embodiments the outermost portion of the outer cladding 106 is second outer cladding portion. The relative refractive indices are given in percentages based from the refractive index of pure silica glass $SiO_2$.

It should be understood that the phrase "pure silica glass," as used herein, means that the region or layer of the optical fiber comprising "pure silica glass" does not contain material, such as dopants and/or other trace materials, in an amount which would significantly alter the refractive index of the silica glass region or portion. However, small amounts of dopants (e.g., chlorine and/or fluorine in an amount less than 1500 ppm of each) may be present in the region or portion of the fiber that is referred to as being "silica" or "pure silica."

As used herein, an updopant is a material or dopant that increases the refractive index of the glass relative to pure silica. Such updopants may be, for example, chlorine, germania, N, phosphorous, titania or alumina.

As used herein, a down dopant is a material or dopant that decreases the refractive index of the glass relative to pure silica. Such down dopants may be fluorine (F), or or boron (e.g., $B_2O_3$).

Chromatic dispersion" (which may be referred to herein as "dispersion" unless otherwise noted) of a waveguide fiber is the sum of the material dispersion and the waveguide dispersion. A zero dispersion wavelength is a wavelength at which the dispersion has a value of zero and also referred to herein as Lambda 0 or $\lambda_0$. Dispersion slope is the rate of change of dispersion with respect to wavelength.

"Effective area" is defined in equation 1 as:

$$A_{eff}=2\pi(\int f^2 r\,dr)^2/(\int f^4 r\,dr) \quad \text{(Eq. 1)}$$

where the integration limits are 0 to ∞, and f is the transverse component of the electric field associated with light propagated in the waveguide. As used herein, "effective area" or "$A_{eff}$" refers to optical effective area at a wavelength of 1550 nm unless otherwise noted. The LP01 effective area refers to the effective area of the light in the fundamental or LP01 optical mode of the optical fiber.

The term "α-profile" (also referred to herein as alpha profile or just alpha) refers to a relative refractive index profile of the core region expressed in terms of Δ(r) which is in units of "%", where r is radius. Δr is represented by equation 2, $$\Delta(r)=\Delta(r_o)(1-[|r-r_o|/(r_1-r_o)]^{\alpha}) \quad \text{(Eq. 2)}$$

where $r_o$ is the point at which Δ(r) is maximum, $r_1$ is the point at which Δ(r) is zero, and r is in the range $r_i \leq r \leq r_f$, where Δ is defined above, $r_i$ is the initial point of the α-profile, $r_f$ is the final point of the α-profile, and a is an exponent which is a real number.

The mode field diameter (MFD) is measured using the Peterman II method as shown in equations 3 and 4, respectively wherein, $$2w=MFD \quad \text{(Eq. 3)}$$

and $$w^2=(2\int f^2 r\,dr/\int[df/dr]^2 r\,dr) \quad \text{(Eq. 4)}$$

wherein the integral limits are 0 to ∞.

The bend resistance of a waveguide fiber can be gauged by induced attenuation under prescribed test conditions, such as by deploying or wrapping the fiber around a mandrel having a prescribed diameter, e.g., by wrapping 1 turn around either a 6 mm, 10 mm, 20 mm, 30 mm or similar diameter mandrel (e.g. "1×10 mm diameter macrobend loss" or the "1×30 mm diameter macrobend loss") and measuring the increase in attenuation per turn.

One type of bend test is the lateral load microbend test. In a so-called "lateral load wire mesh" test (LLWM), a prescribed length of waveguide fiber is placed between two flat plates. A #70 wire mesh is attached to one of the plates. A known length of waveguide fiber is sandwiched between the plates, and a reference attenuation is measured while the plates are pressed together with a force of 30 Newtons. A 70 Newton force is then applied to the plates and the increase in attenuation in dB/m is measured. The increase in attenuation is the lateral load attenuation of the waveguide in dB/m at a specified wavelength (typically within the range of 1200-1700 nm, e.g., 1310 nm or 1550 nm or 1625 nm).

The "pin array" bend test is used to compare relative resistance of waveguide fiber to bending. To perform this test, attenuation loss is measured for a waveguide fiber with essentially no induced bending loss. The waveguide fiber is then woven about the pin array and attenuation again measured. The loss induced by bending is the difference between the two measured attenuations. In embodiments, the pin array is a set of ten cylindrical pins arranged in a single row and held in a fixed vertical position on a flat surface. The pin spacing is 5 mm, center to center, and the pin diameter is 0.67 mm. During testing, sufficient tension is applied to make the waveguide fiber conform to a portion of the pin surface. The increase in attenuation is the pin array attenuation in dB of the waveguide at a specified wavelength (typically within the range of 1200-1700 nm, e.g., 1310 nm or 1550 nm or 1625 nm).

The theoretical fiber cutoff wavelength, "theoretical fiber cutoff", or "theoretical cutoff" for a given mode is the wavelength above which guided light cannot propagate in that mode. A mathematical definition can be found in "Single Mode Fiber Optics," Jeunhomme, pp. 39-44, Marcel Dekker, New York, 1990 wherein the theoretical fiber cutoff is described as the wavelength at which the mode propagation constant becomes equal to the plane wave propagation constant in the outer cladding. This theoretical wavelength is appropriate for an infinitely long, perfectly straight fiber that has no diameter variations.

Fiber cutoff is measured by the standard 2 m fiber cutoff test, FOTP-80 (EIA-TIA-455-80), to yield the "fiber cutoff wavelength," also known as the "2 m fiber cutoff" or "measured cutoff." The FOTP-80 standard test is performed to either strip out the higher order modes using a controlled amount of bending, or to normalize the spectral response of the fiber to that of a multimode fiber.

By cabled cutoff wavelength, or "cabled cutoff" as used herein, we mean the 22 m cabled cutoff test described in the EIA-445 Fiber Optic Test Procedures, which are part of the EIA-TIA Fiber Optics Standards, that is, the Electronics Industry Alliance-Telecommunications Industry Association Fiber Optics Standards.

Unless otherwise noted herein, optical properties (such as dispersion, dispersion slope, etc.) are reported for the LP01 mode.

Figure 1B:
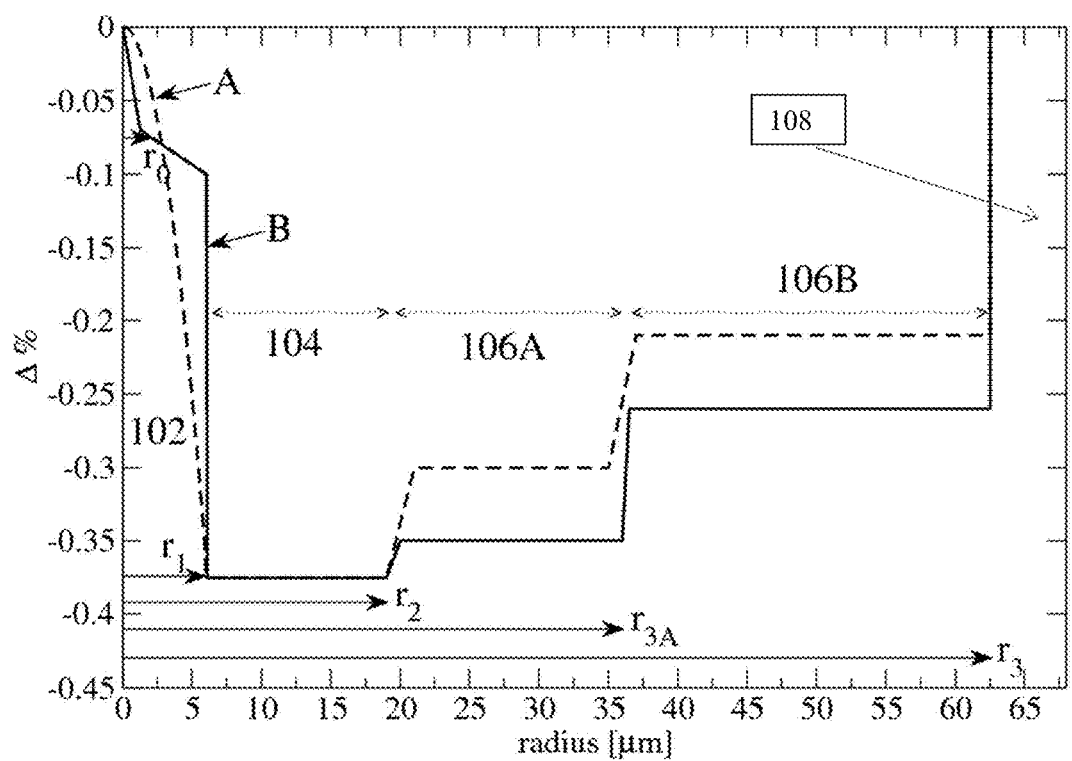
FIG. 1B graphically depict index versus radius of two embodiments of the optical fiber depicted in FIG. 1A.

Embodiments of optical fibers 100 described herein generally comprise an optical fiber having a glass core 102 made from pure silica ($SiO_2$), or silica doped with updopants (for example, germania ($GeO_2$)) and/or down dopants. In the exemplary embodiments described herein the fiber 100 is a passive transmission fiber, and the fiber core does not contain rare earth (active) dopants such as Yb, Er, or Nd. FIG. 1B graphically depicts exemplary index profiles (curves A and B) versus radius of two embodiments of the optical fiber 100 depicted in FIG. 1A (the coating layer is not shown). In some embodiments the fiber core 102 (also referred to herein as core layer and core portion) of the optical fiber 100 has a maximum relative refractive index $\Delta_{coreMAX}$, relative to silica (see, for example, FIG. 1B). In some embodiments the fiber core 102 may comprise of two portions 102A and 102B, as shown by curve B in FIG. 1B, with a maximum relative refractive index $\Delta_{coreMAX}=\Delta_0$ corresponding to core portion 102A, which is surrounded by the core portion with the a maximum relative refractive index $\Delta_{1MAX}$. In some embodiments $\Delta_0 > \Delta_{1MAX}$. In some embodiments the core 102 (see, for example, curve A in FIG.

1B) comprises only one core portion, with the maximum refractive index delta $\Delta_{coreMAX}$.

Figure 1C:
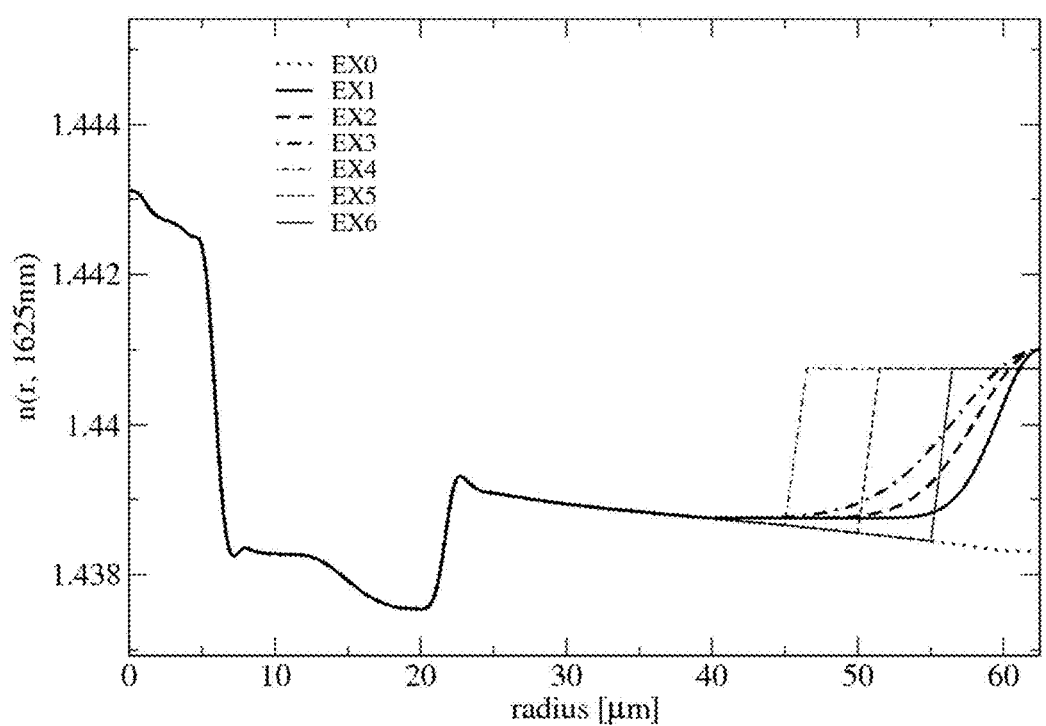
FIG. 1C graphically depicts index versus radius of several embodiments of the optical fiber depicted in FIG. 1A and that of a typical commercial (comparative) fiber.

FIG. 1C graphically depicts index versus radius of several embodiments of the optical fiber 100 depicted in FIG. 1A (fiber EX 1-6) and that of a typical commercial (comparative) fiber (EX 0). The core and inner cladding of these fibers have the same refractive index profiles, but the outer cladding 106 of the optical fiber embodiments 100 is different from that of the comparative fiber. The comparative fiber (EX 0, dotted line) does not include an outer cladding with the raised index outer cladding portion 106B adjacent to the cladding-coating interface. Instead the refractive index curve associated with the outer cladding corresponds to this comparative optical fiber continues to slope downward from the radius of about 22.5 µm to the outer cladding radius $r_3$=62.5. In contrast the refractive index profiles of the optical fiber 100 exhibit a raised refractive index at the outer portion of the outer cladding 106.

Referring again to FIG. 1C, the optical fiber 100 has silica based inner cladding 104 (also referred to herein as an inner cladding layer) surrounding the core 102 and directly adjacent to the core. The inner cladding 104 has a relative refractive index $\Delta_{2MIN}$, and $\Delta_{coreMAX} > \Delta_{2MIN}$, and in the exemplary embodiments described herein is made of silica based glass. The core 102 and the inner cladding 104 may comprise dopants, as described in more detail herein. The cross section of the optical fiber 100 may be generally circular-symmetric with respect to the center of the core 102 and the core 102 may have a radius $r_1$ and a radial thickness $T_1 = r_1$. The core 102 may have a radial thickness of greater than or equal to about 3.0 microns, such as greater than or equal to about 4.0 microns. The core may have a radial thickness less than or equal to about 10 microns, such as less than or equal to about 8 or 7.0 microns. Accordingly, in some embodiments, the radial thickness $T_1$ may be from greater than or equal to about 3.0 microns to less than or equal to about 8.0 microns, such as from greater than or equal to about 4.0 microns to less than or equal to about 7.0 microns (e.g., 5 to 6 microns). In other embodiments, the radial thickness $T_1$ may be about 5.5-6 microns. However, it should be understood that the core 102 may have different dimensions to facilitate various other embodiments. In some embodiments the maximum relative refractive index of the core $\Delta_{coreMAX}$ (relative to silica) is between −0.05% and 0.5%. In some embodiments the core comprises either no germania, or less than 0.1 wt % germania.

In some embodiments, the core 102 comprises silica glass ($SiO_2$) and one or more index of refraction raising dopants (referred to herein as "updopants") such as, for example, $GeO_2$, Cl, $Al_2O_3$, $P_2O_5$, $TiO_2$, $ZrO_2$, $Nb_2O_5$ and/or $Ta_2O_5$.

In other embodiments the core does not contain updopants. The core 102 or an inner portion of the core 102 may be made of essentially pure silica. However, the core 102 may include some alkali, for example potassium (e.g., <0.05 wt %, or 20 to 1000 ppm by weight) or chlorine (e.g. <0.05 wt %) to control its viscosity. Trace dopant levels having concentrations less than 1500 ppm may also be present.

In some embodiments the core contains a down dopant, for example by fluorine or boron. In some embodiments the core is a silica based core and contains both updopants and down dopants. In some embodiments, the core 102 has a maximum relative refractive index $\Delta_{coreMAX}$ (relative to pure silica) is between −0.04% and 0.04%, for example between −0.02% and 0.02%. In some embodiments, the core 102 has the relative refractive index $\Delta_1$ between 0 and 0.02%. For example, the core 102 may have a maximum relative reflective index $\Delta_{coreMAX}$ of between 0 and 0.02% (relative to pure silica), such as between 0% and 0.015%.

In some embodiments, the core 102 is updoped with $GeO_2$. For example, the core 102 may contain less than or equal to about 3 weight % $GeO_2$. In embodiments where at least a portion of the core 102 is updoped, the maximum relative refractive index $\Delta_{coreMAX}$ of the core 102 may be, for example, between 0% and 0.2%.

In some embodiments, the core 102 has a relative refractive index profile with profile parameter a having values larger than 5, for example 5 to 20, or 12 to 18. In some other embodiments, the core 102 has a relative refractive index profile with profile parameter a ranging between 1.5 and 5.

The inner cladding 104 surrounds the core 102 and extends from the radius $r_1$ to the radius $r_2$ such that the inner cladding has a radial thickness $T_2 = r_2 - r_1$. The radial thickness $T_2$ of the inner cladding 104 may depend on the desired dimensions of the core 102 and the desired dimensions and properties of the other glass portion(s) of the optical fiber 100. In some exemplary embodiments, the inner cladding may have a radial thickness $T_2$ of greater 5 microns and in at least some embodiments greater than or equal to about 10 microns, such as between 10 and 20 microns. In some embodiments $T_2$ is 12-16 microns, and in some embodiments $T_2$ is 13-15 microns. Accordingly, in some embodiments, the inner cladding 104 may have an outer radius $r_2$ from greater than or equal to about 13 microns to less than or equal to about 28 microns, such as from greater than or equal to about 15 microns to less than or equal to about 25 microns (e.g., 17 microns, 18 microns, 19 microns, 20 microns, 21 microns, 22 microns, or therebetween).

In some exemplary embodiments, the inner cladding 104 of fiber 100 is comprises down doped silica. Preferably, the inner cladding 104 has a minimum relative refractive index delta (relative to pure silica) $\Delta 2_{MIN}$ of less than −0.2%; for example less than −0.25%, less than −0.3% or −0.6%<$\Delta 2_{MIN}$<−0.2%. The inner cladding 104 can be made of glass doped with an index decreasing dopant such as F, or B. The outer cladding layer 106 may surround and directly contact the inner cladding 104. In some embodiments the inner cladding 104 has a minimum relative refractive index $\Delta_{2MIN}$, where $\Delta_{2MIN}$ is between −0.1% and −0.7% (relative to pure silica), more preferably between −0.3 and −0.5%.

An outer cladding 106 surrounds the inner cladding 104 and extends from the radius $r_2$ to the radius $r_3$ such that the outer cladding has a radial thickness $T_3 = r_3 - r_2$. Accordingly, the optical fiber 100 (e.g., the core 102, inner cladding 104 and outer cladding 106) may have an outer diameter $2r_3$. In some embodiments, the radial thickness $T_3$ of the outer cladding 106 may be less than or equal to about 55 microns, such as less than or equal to about 50 microns. In some embodiments, the radial thickness $T_3$ of the outer cladding 106 may be less than or equal to about 45 microns, for example, less than or equal to about 40 microns. The outer cladding 106 (also referred to herein as outer clad) comprises at least two portions, a first outer cladding portion 106A (also referred to herein as first outer cladding layer) and an outermost portion 106B, which in the embodiments shown in FIGS. 1B and 1C is a second outer cladding portion 106B (also referred to herein as second outer cladding layer or the second outer clad layer). The first outer cladding portion 106A is directly adjacent to the inner cladding 104 and extends from the radius $r_2$ to the radius $r_{3A}$. The second outer cladding portion 106B surrounds the first outer cladding portion 106A and at least in some embodiments extends from the radius $r_{3A}$ to the outer radius $r_3$. Both outer cladding portions 106A and 106B can be silica based glass. In some embodiments, the first outer cladding portion 106A of the cladding 106 comprises down-doped silica glass. Therefore, in these embodiments $\Delta_{coreMAX} > \Delta_{3A} > \Delta_{2MIN}$ and the average relative refractive index $\Delta_{3A}$ of the first outer cladding portion 106A may be, for example, between −0.1% and −0.4%, or in some embodiments −0.15% and −0.35%. Other materials may also be utilized for the outer cladding. The outer cladding portion 106B has an elevated refracting index and is not located in close proximity to the core, but is spaced apart from the core such that the distance d from the outer radius of the core 102 and the inner radius of the outer cladding portion 106B is at least 20 microns, and in some embodiments at least 25 microns. In some embodiments the distance from the outer radius of the core 102 and the inner radius of the outer cladding portion 106B is 30 microns to 60 microns. As shown in FIGS. 1B and 1C, in these exemplary fiber embodiments 100, the outer cladding portion 106B of the outer cladding 106 has the highest index of refraction than any other portion or region of the cladding 106.

The portion 106B of the outer cladding 106 is the outermost cladding portion, and it is the macrobend loss mitigating layer of the fiber 100. For example, in the exemplary embodiments shown in FIGS. 1B and/or 1C the second outer cladding portion 106B is the macrobend loss mitigating layer. The first outer cladding portion 106A is situated under the cladding portion 106B and directly adjacent to the inner cladding 104. The first outer cladding portion 106A has a relative refractive index $\Delta_{3A}$ such that $\Delta_{coreMAX} > \Delta_{3A} > \Delta_{2MIN}$. The portion 106B of the outer cladding 106 surrounds the outer cladding portion 106A and at least in some embodiments is directly adjacent to the first outer cladding portion 106A. Other cladding layers may optionally be situated between the outer cladding portion 106A and the outer cladding portion 106B. According to some fiber embodiments, the outer most cladding portion 106B has a relative refractive index $\Delta_{3B}$, and $\Delta_{3B} > \Delta_{3A}$. According to some embodiments, $(\Delta_{3B} - \Delta_{3A}) \geq 0.02\%$. According to some embodiments, $(\Delta_{3B} - \Delta_{3A}) \geq 0.08\%$. According to some embodiments, $(\Delta_{3B} - \Delta_{3A}) \geq 0.1\%$. According to some embodiments, $(\Delta_{3B} - \Delta_{3A}) \leq 0.2\%$. According to some embodiments, $0.2\% \geq (\Delta_{3B} - \Delta_{3A}) \geq 0.02\%$. According to some embodiments, $0.2\% \geq (\Delta_{3B} - \Delta_{3A}) \geq 0.05\%$. As should be understood, composition of the layers (106A, 106B) determines the refractive index (index delta) of each layer.

In some embodiments, the second (or the outermost) outer cladding portion 106B of the cladding 106 also comprises down doped silica glass. In some embodiments the average relative refractive index $\Delta_{3B}$ of the outer cladding portion 106B is about 0% to −0.3% (relative to silica), and in some embodiments −0.1% to −0.25%. It is noted that in these embodiments $\Delta_{3B} > \Delta_{3A}$ Thus, the outer cladding portion 106B forms a high refractive index ring (see FIG. 1B) at the outer perimeter of the cladding 106. That is, the outer most portion (or the second outer cladding portion 106B) of the cladding 106 has a refractive index higher than the refractive index of the preceding cladding portion, and it functions to mitigate/minimize macrobend losses. A polymer based coating layer 108 surrounds the glass cladding 106 and is in contact with the cladding portion 106B. The refractive index of the outermost cladding portion 106B is lower than that of the primary coating layer(s) 108A. In some embodiments, the refractive index of the coating layer 108 or the primary coating layer(s) 108A is $1.5 \geq \Delta_C \geq 1.45$ at a wavelength $\lambda$, where 80 nm $\leq \lambda \leq$ 1550 nm (e.g., at 850 nm or at 1550 nm). In some embodiments in some embodiments $1.5 \geq \Delta_C \geq 1.45$ at 1550 nm, $\Delta_C - \Delta_{3B} \geq 0.5\%$; and the difference between the refractive index delta of the second outer cladding portion and the first outer cladding portion is $1.0\% \geq \Delta_{3B} - \Delta_{3A} \geq 0.05\%$.

The outermost portion (or the second outer cladding portion 106B) of the cladding 106 is situated at or directly adjacent to the cladding/coating interface—i.e., it is situated in contact with the polymeric coating layer 108. The outer cladding portion 106B minimizes sensitivity of the bend loss to variations in the fiber index profile parameters, for example, those that occur during the fiber draw, and/or coating process(es), and reduces the magnitude, and/or shifts the position of the peaks in the macrobend loss as a function of the fiber bend diameter and operating wavelength. This enables the optical drawn fiber to have excellent bend performance (low macro-bend loss).

FIG. 1C illustrates different fiber profiles of the optical fiber 100, where the first outer cladding portion 106A starts at a 20 micron radius and ends at one of three different exemplary radial positions (45 microns, 50 microns and 55 microns), followed by a silica based layer (corresponding to the second outer cladding portion 106B) that is, for example, either lower in down-dopant(s) dopant concentration (as compared to the first outer cladding portion 106A) or is free of down dopants. Thus, the second outer cladding portion 106B in these embodiments fibers 100 is higher in refractive index than first outer cladding portion 106A, and forms a high refractive index ring at the outer portion of the cladding 106. More specifically, FIG. 1C illustrates refractive index profile of a comparative optical fiber (dotted line) and the optical fiber embodiments 100 that have a similar core, inner cladding but with a graded (thick solid, dashed and dot-dashed lines) or step-like (thin solid, dashed and dot-dashed lines) outer cladding portion 106B adjacent to the cladding-coating interface. The graded profiles of the outer cladding portion 106B are assumed to have a Gaussian dependence with a maximum $\Delta n$ at $r=62.5$ µm and width $\sigma$. The width $\sigma$ is defined according to the standard definition of the Gaussian function centered at the clad/coat interface (e.g., at $r_c=62.5$ micron), for example: $\exp(-(r-r_c)^2/\sigma^2)$. For the fiber embodiments with the step-like relative refractive index delta profile of the outer cladding layer 106B outer radius $r_3$ of the layer 106B and thus inner radius of the coating is $r_3 \geq 62.5$ µm. In some embodiments, refractive index $n_C$ of the coating layer 108A of the exemplary fibers 100 is $1.5 > n_C \geq 1.45$ (at a wavelength $\lambda$ situated between 800 nm and 1550 nm). For example, the typical refractive index $n_C$ of the coating layer 108A of at least some the exemplary fiber embodiments 100 is $1.5 > n_C \geq 1.45$ (at 1550 nm), for example $1.461 > n_C \geq 1.45$ (at 1550 nm). In some embodiments, refractive index $n_C$ of the coating layer 108A of the exemplary fibers 100 is $1.5 > n_C \geq 1.45$ (at a wavelength $\lambda$ situated between 800 nm and 1850 nm). In some embodiments refractive index $n_C$ of the coating layer 108A situated in a range of 1.476 to 1.494 at 1550 nm. For example, for the fibers depicted in FIG. 1C the refractive index $n_C$ of the primary coating layer is 1.46 (at 1550 nm, not shown). (In the embodiments described herein the primary coating layer 108A begins at a radius $\geq 62.5$ µm) In at least some embodiments of the optical fibers 100, $\Delta_C > \Delta_{coreMAX}$ and $1.1\% \geq \Delta_C - \Delta_{3B} \geq 0.6\%$. In some embodiments $1.05\% \geq \Delta_C - \Delta_{3B} \geq 0.7\%$.

In some embodiments the coating 108 may include a primary coating 108A contacting and surrounding the outer annular cladding outer cladding portion 106B, and a secondary coating 108B. Coating 108A may be formed from a soft crosslinked polymer material having a low in situ modulus (e.g., less than about 0.35 MPa at 25° C.) and a low in situ $T_g$ (e.g., less than about −35° C. A number of suitable primary coating compositions are disclosed, for example in U.S. Pat. No. 6,326,416 to Chien et al., U.S. Pat. No. 6,531,522 to Winningham et al., U.S. Pat. No. 6,539,152 to Fewkes et al., U.S. Pat. No. 6,563,996 to Winningham, U.S. Pat. No. 6,869,981 to Fewkes et al., U.S. Pat. Nos. 7,010,206 and 7,221,842 to Baker et al., and U.S. Pat. No. 7,423,105 to Winningham, each of which is incorporated herein by reference in its entirety.

The primary coating 108A preferably has a higher refractive index than the cladding 106 of the optical fiber 100, in order to allow it to strip errant optical signals away from the core of optical fiber. For example, an exemplary optical fiber 100 may have refractive index values at a wavelength of 1550 nm for the core and outer cladding of 1.447 and 1.436, respectively; as such, it is desirable that the refractive index ($n_C$) of primary coating 108A be greater than 1.44 at 1550 nm, e. g., 1.45 to 1.461. According to at least some embodiments the refractive index of the coating 108A is also higher than that of the maximum refractive index of the core 102—i.e., $\Delta_C > \Delta_{coreMAX}$. The primary coating 108A maintains adequate adhesion to the glass fiber during thermal and hydrolytic aging, yet (if needed) is capable of being strippable therefrom for splicing purposes. The primary coating 108A typically has a thickness in the range of 20-50 μm (e.g., about 25 or 32.5 μm). The primary coating 108A, if needed, can be applied to the optical fiber as a liquid and cured. The secondary coating 108B, is an outer coating and it contacts and surrounds the primary coating 108A. In some embodiments the secondary coating 108B, has an in situ modulus of greater than 1200 MPa, preferably greater than 1300 MPA. A secondary coating with a high in situ modulus reduces the microbending which is the coupling mechanism between the modes propagating in the fiber. The outer coating material 108B, is, for example, the polymerization product of a coating composition whose molecules become highly cross-linked when polymerized.

Figure 2:
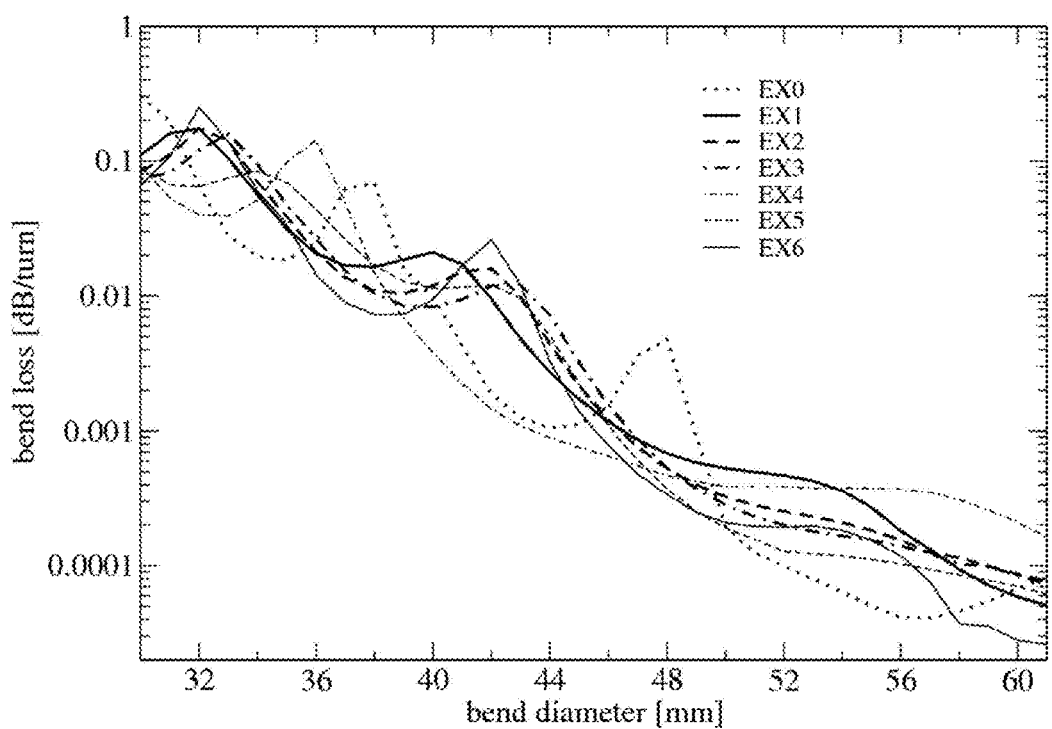
FIG. 2 illustrates oscillatory behavior of bend lass as a function of fiber's bend diameter.

Many comparative commercial glass optical fibers have a strong refractive index contrast at the interface between the cladding and the primary coating layer, due to large differences between the glass and coating's polymer material properties. This large change in the refractive index at the clad-coat interface leads to an oscillatory dependence of the macrobend loss on the fiber bend diameter. FIG. 2 illustrates oscillatory behavior of bend loss as a function of fiber's bend diameter. More specifically, FIG. 2 illustrates computed macrobend loss dependence on the bend diameter for corresponding fiber index profiles of the fiber embodiments (Ex 1-6) shown in FIG. 1C, and for a comparative fiber (EX 0). As FIG. 1C illustrates, the comparative fiber (EX 0 fiber) does not include an outer cladding with the raised index outer cladding portion 106B adjacent to the cladding-coating interface.

If the refractive indices cladding and coating of the fiber are equal, the oscillations apparent in the bend loss vs. bend diameter plots vanish in the limit of a coating thickness>>$r_3$, and the macrobend loss dependence on the bend diameter reduces to a monotonic exponential function. However, in practice, in comparative commercial fibers the oscillations are always present, due to the coating layer index of refraction, which typically significantly higher compared to that the fiber's cladding. Without being bound by theory, applicants believe that the bend loss oscillations result from the partial reflection of the radiated waves at the cladding/coat interface, leading to the interference effect and to corresponding minima and maxima in the bend loss vs. bend radius dependence.

Applicants discovered that the modification of the refractive index distribution at the cladding/coating interface has a significant effect on the magnitude and location of the bend loss oscillation maxima. In particular, applicants discovered that a high refractive index ring (relative to the index of the cladding portion 106A) formed by the outer cladding portion 106B and situated at and/adjacent to the interface of the cladding and the coating layer (108A, or 108) advantageously reduces the magnitude of the bend loss oscillations and/or to modifies the position of the loss maxima (relative to a comparative fiber without the outer cladding portion 106B), which helps to achieve a low bend loss operation of the manufactured fibers in the bend diameter range of interest.

FIG. 2 illustrates the change in the position of the bend loss maxima and reduction in the magnitude of the oscillations with addition of the high-index outer cladding portion 106B for exemplary fiber profiles shown in FIG. 1C. FIG. 2 illustrates that either a graded ring profile or a step-like index increase in the outer portion of cladding 106 (forming the high-index outer cladding portion 106B) can be used to achieve smaller variability in the bend loss dependence on the bend diameter. The dependence of the peak-to-peak loss reduction on the index of outer cladding portion 106B was found to be a smaller effect, and in practice the maximum value of the refractive index of the outer cladding layer 106B can be preferably limited to be less than the effective index $n_{eff}$ of the fundamental $LP_{01}$ mode ($n_{106B} < n_{eff}$) in order to advantageously minimize propagation losses. That is, if the outer cladding layer 106B has a refractive index that is equal to or larger than the effective index of the $LP_{01}$ mode ($n_{eff}$ of $LP_{01}$), then $LP_{01}$ mode couples more easily to the lossy modes in the outer clad, leading to additional loss in $LP_{01}$. Thus, it is preferable that the refractive index of the outer cladding layer 106B be less than the effective index $n_{eff}$ of the fundamental $LP_{01}$ mode of the operating wavelength.

Figure 3A:
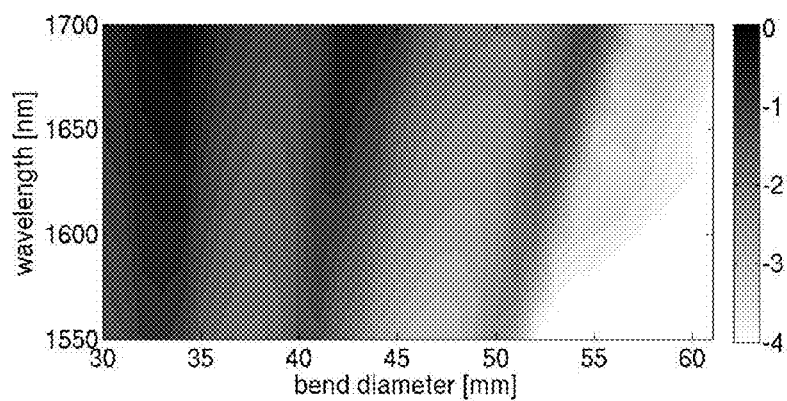
FIG. 3A-3B illustrates modeled contour maps of the computed bend loss dependence on the bend diameter for a comparative.
Figure 3B:
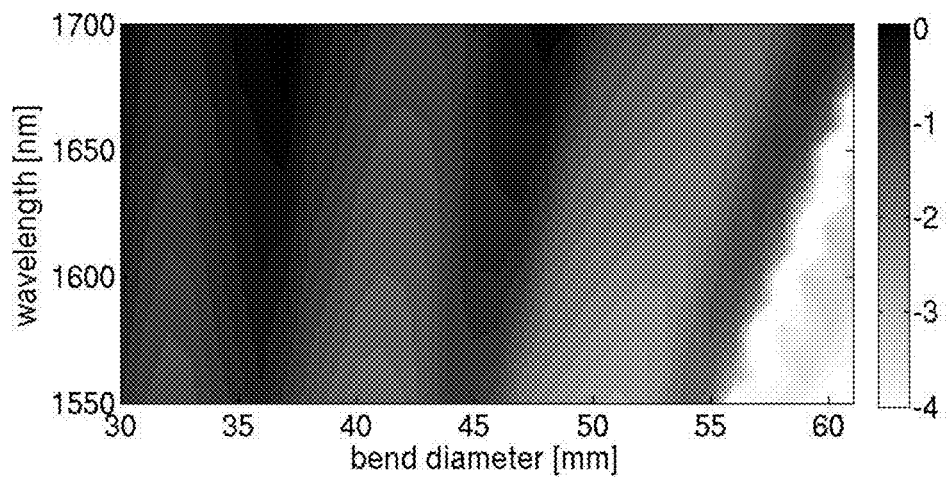

FIG. 3A illustrates modeled contour map of the computed bend loss (shown as $\log_{10}$ of the bend loss value in dB/turn in FIG. 3A, and also in FIGS. 3B-D) dependence on the bend diameter 1550 nm wavelength for standard, nominally performing comparative fiber (i.e. optimally designed fiber that does not include a raised outer cladding portion 106B, and that has no manufacturing process induced variations). This fiber has a low loss at bend diameters at about 50 mm-60 mm. FIG. 3B illustrates the performance of the same optical fiber when it is made under normal manufacturing conditions—i.e., to the same fiber but made with typical manufacturing process induced changes in the index profile. More specifically, comparing FIGS. 3A and 3B, we can see that the modeled fiber with typical manufacturing parameter deviations from a nominal design has an increased bend loss at bend diameters greater than 50 mm vs. that of the nominal fiber. For example, FIG. 3B illustrates increased 1550 nm bend loss at 55 mm diameter. As stated above, this loss is due to the typical manufacturing process induced changes in the index profile.

Figure 3C:
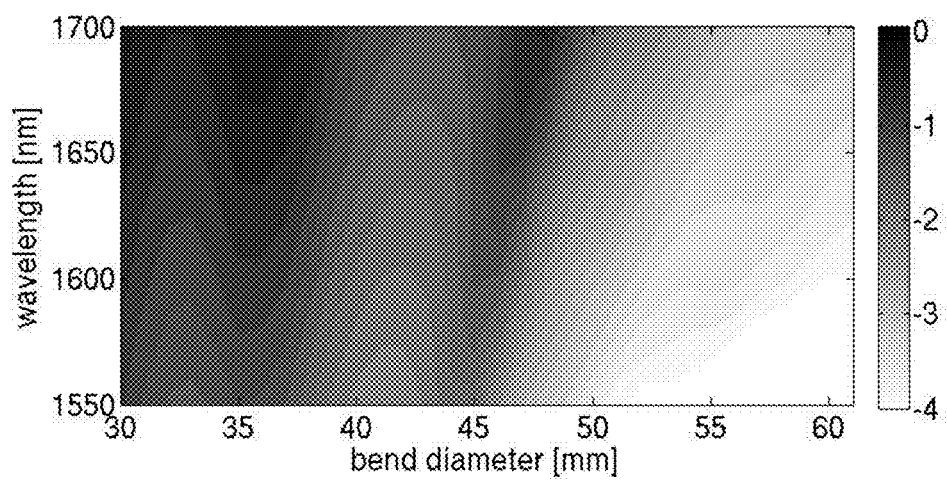
FIGS. 3C and 3D illustrates modeled contour maps of the computed bend loss dependence on the bend diameter for one embodiment of the optical fiber described herein.
Figure 3D:
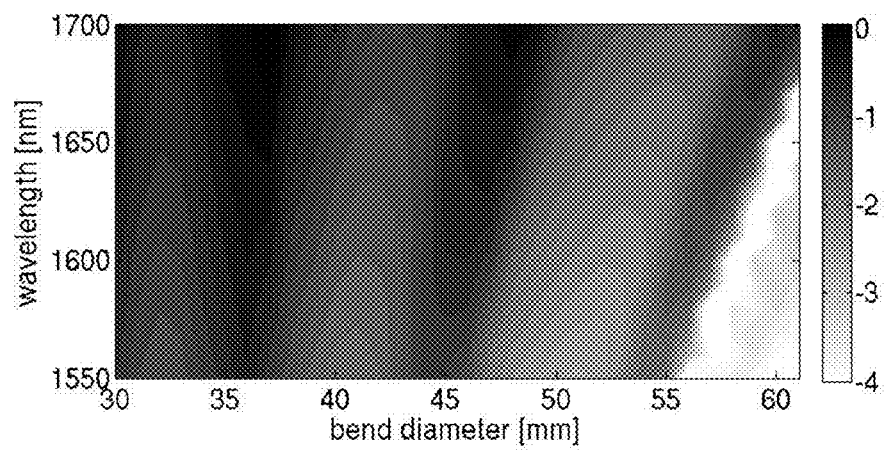

The bend loss for similar fibers but with the high-index ring (corresponding to the outer cladding portion 106B) situated at the cladding-coating interface is shown in FIGS. 3C and 3D, respectively. FIG. 3C corresponds to the performance of nominal optical fiber 100 (i.e., of the fiber without manufacturing deviations). FIG. 3D corresponds to the performance of optical fiber 100 made under normal manufacturing conditions. (In general, manufacturing (or process) deviations here are meant to signify any unintentional changes in the fiber making process parameters, that lead to corresponding changes in the final fiber's index of refraction.) FIG. 3C shows that addition of the high-index ring in the fiber's refractive index profile (i.e., higher index outermost portion 106B of the outer cladding 106) does not degrade fibers performance relative to the nominal bend performance of the comparative fiber without the high-index ring in the cladding (shown in FIG. 3A)—i.e., the performance of the two fibers as illustrated in FIGS. 3A and 3C is at least substantially the same,). FIG. 3C also illustrates improvement in performance of the optical fiber 100 at the bend diameters in 48-60 mm range, as compared to the performance of the comparative fiber shown in FIG. 3A. (Note: the improvement is in terms of removing the undesired oscillatory dependence of the bend loss on the bend diameter, and overall lower average loss.)

FIG. 3D illustrates that the optical fiber 100 that has the outer cladding portion 106B, when modeled with typical manufacturing parameter deviations from a nominal design, performs much better than a similar comparative fiber made under similar conditions (whose performance is shown FIG. 3B). More specifically, as shown in FIG. 3D, the spectral peak apparent in the bend loss vs. wavelength dependence of the fiber without the ring for bend diameters in the 55 mm to 60 mm window is eliminated with the introduction of the high-index ring associated with the outer cladding portion 106B, due to a shift of the oscillation maxima, thus advantageously mitigating/minimizing the elevated bend loss due to manufacturing process variation induced changes in the fiber profile. Furthermore, the addition of a high-index ring at the clad-coat interface associated with the outer cladding portion 106B also leads to higher radiative losses of non-guided modes, thus reducing the straight fiber cutoff wavelength, and compensating the lengthening of the cutoff wavelength caused by the inner cladding 104 being situated adjacent to the fiber core. Therefore, outer cladding portion 106B reduces the bend loss at the required bend diameters without causing the cutoff-wavelength to shift to a longer cutoff wavelength. (Note: although the fiber cutoff wavelength was calculated for modeling/simulation purposes, it is understood that the shifts in a fiber cut off wavelength correspond to similar shifts in a cable cutoff wavelength. If the fiber cutoff wavelength becomes shorter, the cable cutoff wavelength becomes shorter as well. Similarly, If the fiber cutoff wavelength shifts to the longer wavelength, the cable cutoff wavelength becomes longer as well. Therefore the addition of a high-index ring at the clad-coat interface associated with the outer cladding portion 106B also reduces the cable cutoff wavelength)

According to some embodiments the optical fiber 100 has macrobend loss<0.03 dB/turn at 50 mm bend diameter, macrobend loss<0.003 dB/turn at 60 mm bend diameter, and macrobend loss of <0.001 dB/turn at 75 mm bend diameter. According to some embodiments the optical fiber is a single mode optical fiber and has dispersion less than or equal to about 23 ps/nm·km at a wavelength of 1550 nm. According to some embodiments the optical fiber is a single mode optical fiber and has a cable cutoff wavelength<1530 nm.

The index of refraction of the outer cladding in conventional long haul fibers is generally uniform and does not have a high index ring adjacent to the cladding/coating interface, because the typical outer cladding in a conventional long haul fiber is made of the same material (i.e., it has substantially uniform composition). Applicants discovered that having higher index of refraction at the outermost portion of the outer cladding (second outer cladding portion) 106B compared to that of preceding outer cladding layer (e.g., compared to that of the first outer cladding portion 106A) results in an un-expected advantage—i.e., it results in the decrease macrobend losses at the specified bend diameters. In some embodiments, a difference between the refractive index of the cladding portions 106A and 106B may be greater than or equal to 0.05%. In some embodiments, a difference between refractive index of the cladding portions 106A and 106B may be greater than or equal to about 0.05% and less than 0.15%.

Embodiments of the optical fiber disclosed herein have reduced attenuation. For example, the optical fiber 100 may have an attenuation of less than or equal to about 0.185 dB/km at a wavelength of 1550 nm. In some embodiments, the optical fiber may have an attenuation of less than or equal to about 0.18 dB/km at a wavelength of 1550 nm, such as less than or equal to about 0.175 dB/km at a wavelength of 1550 nm, for example 0.155 to 0.173 dB/km at 1550 nm, or for example 0.159 dB/km to 0.17 dB/km.

The exemplary embodiments of fiber designs disclosed herein result in fibers having optical properties that are G.654 compliant (ITU-T standards), and for example may exhibit a cable cutoff less than 1530 nm, such as less than 1500 nm. The G.654 applications the fibers may be configured to have dispersion at 1550 nm, which is less than or equal to 22 ps/nm/km.

In some embodiments, the optical fiber 100 may be a large effective area optical fiber. For example, the optical fiber 100 may have an effective area greater than or equal to about 110 microns$^2$ at a wavelength of 1550 nm, such as greater than or equal to about 112 microns$^2$ at a wavelength of 1550 nm. The optical fiber 100 may have an effective area greater than or equal to about 115 microns$^2$ at a wavelength of 1550 nm. The optical fiber 100 may have an effective area less than or equal to about 200 microns$^2$ at a wavelength of 1550 nm, such as less than or equal to about 135 microns$^2$ at a wavelength of 1550 nm.

The optical fiber 100 may have an effective area of about 100-160 microns$^2$ at a wavelength of 1550 nm, such as less than or equal to about 155 microns$^2$ at a wavelength of 1550 nm. Accordingly, in embodiments, the optical fiber 100 may have an effective area 105-120 microns$^2$. The optical fiber 100 may have an effective area of from greater than or equal to about 110 microns$^2$ to less than or equal to about 120 microns$^2$.

According to some embodiments, the core 102, inner cladding 104, and outer cladding 106 of the optical fiber 100 may be formed by an outside-vapor-deposition (OVD) process. The OVD process is a way of making optical fiber through reactions from the desired vapor ingredients (including silica and the other desired up dopant precursors) via a hydrolysis process in a $CH_4+O_2$ flame to form soot particles (such as in the range of about 2 nm to 5 microns in diameter, and in some embodiments in the range of about 50 to 500 nm in diameter). The soot particles are then collected by thermophoretic process onto either a bait rod (for making a core soot-preform) or a glass core cane or rod (for making the soot preform). The soot preform is subsequently dried and densified into solid transparent glass in a high temperature furnace (after the bait rod is removed from the core preform), a process commonly referred to as consolidation, forming the final fiber preform 204. The desired core and cladding compositions are achieved by utilizing different amounts of various vapor-phase ingredients for each of the layers in the soot preform fabrication process, for example via the following method(s).

Figure 4:
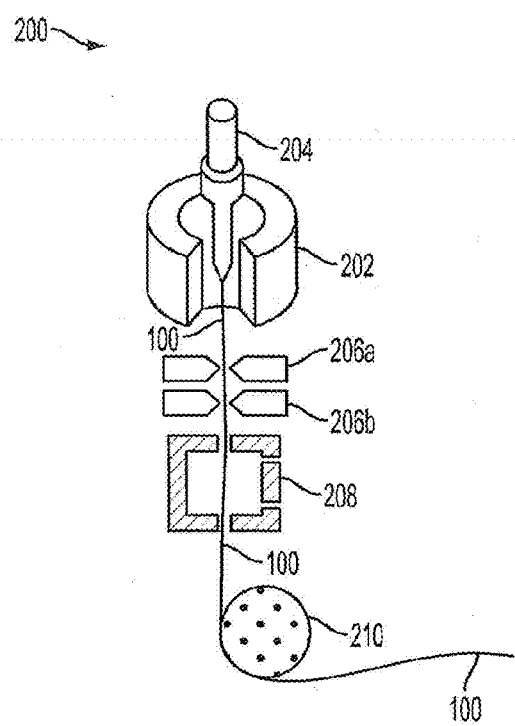
FIG. 4 is a schematic of a system for drawing an optical fiber according to one or more embodiments shown and described herein.

Referring now to FIG. 4, one embodiment of a system 200 for producing an optical fiber is illustrated. The system 200 may comprise a draw furnace 202 for heating an optical fiber preform 204 such that an optical fiber 100 may be drawn from the optical fiber preform 204. The preform 204 may be produced by the OVD method and have the composition and structure as set forth above. The draw furnace 202 may be oriented such that an optical fiber 100 drawn from the optical fiber preform 204 exits the furnace along a substantially vertical pathway.

After the optical fiber 100 exits the draw furnace 202, the diameter of the optical fiber 100 and the draw tension applied to the optical fiber 100 may be measured using non-contact sensors 206a, 206b. Tension may be applied to the optical fiber by any suitable tension-applying mechanism 210. As shown in FIG. 4, after the diameter and tension of the optical fiber 100 are measured, the optical fiber 100 may be passed through a cooling mechanism 208 which provides slow cooling of the optical fiber 100. The cooling mechanism 208 may be any mechanism for cooling an optical fiber as may be presently known in the art or subsequently developed. In one embodiment, the cooling mechanism 208 is filled with a gas that facilitates cooling of the optical fiber 100 at a rate slower than cooling the optical fiber 100 in air at ambient temperatures.

In embodiments, the cooling mechanism 208 may cool the drawn optical fiber from a temperature of about 1600° C. to a temperature of about 1250° C. at a cooling rate of less than or equal to about 5000° C./s, such as less than or equal to about 4750° C./s. In some embodiments, the cooling mechanism 208 may cool the drawn optical fiber from a temperature of about 1600° C. to a temperature of about 1250° C. at a cooling rate of less than or equal to about 4500° C./s, such as less than or equal to about 4250° C./s. In some embodiments, the cooling mechanism 208 may cool the drawn optical fiber from a temperature of about 1250° C. to a temperature of about 1050° C. at a cooling rate of less than or equal to about 12000° C./s, such as less than or equal to about 11500° C./s. The cooling mechanism 208 may cool the drawn optical fiber from a temperature of about 1250° C. to a temperature of about 1050° C. at a cooling rate of less than or equal to about 11000° C./s, such as less than or equal to about 10500° C./s. In some embodiments the cooling mechanism 208 cools the drawn optical fiber from a temperature of about 1400° C. to a temperature of about 1050° C. at a cooling rate of less than or equal to about 4500° C./s, such as less than or equal to about 4250° C./s. In some embodiments, the cooling mechanism 208 may cool the drawn optical fiber from a temperature of about 1050° C. to a temperature of about 850° C. at a cooling rate of less than or equal to about 12000° C./s, such as less than or equal to about 11500° C./s. The cooling mechanism 208 may cool the drawn optical fiber from a temperature of about 1050° C. to a temperature of about 850° C. at a cooling rate of less than or equal to about 11000° C./s, such as less than or equal to about 10500° C./s.

In embodiments described herein, the tension-applying mechanism 210 may apply a tension to the optical fiber 100 of 20 $g_f$ to 400 $g_f$ ($g_f$ refers to grams force), for example 200 $g_f$ or less, or 150 $g_f$ or less (e.g., 30 $g_f$ to 150 $g_f$).

Embodiments Will be Further Clarified by the Following Examples

Figure 5A:
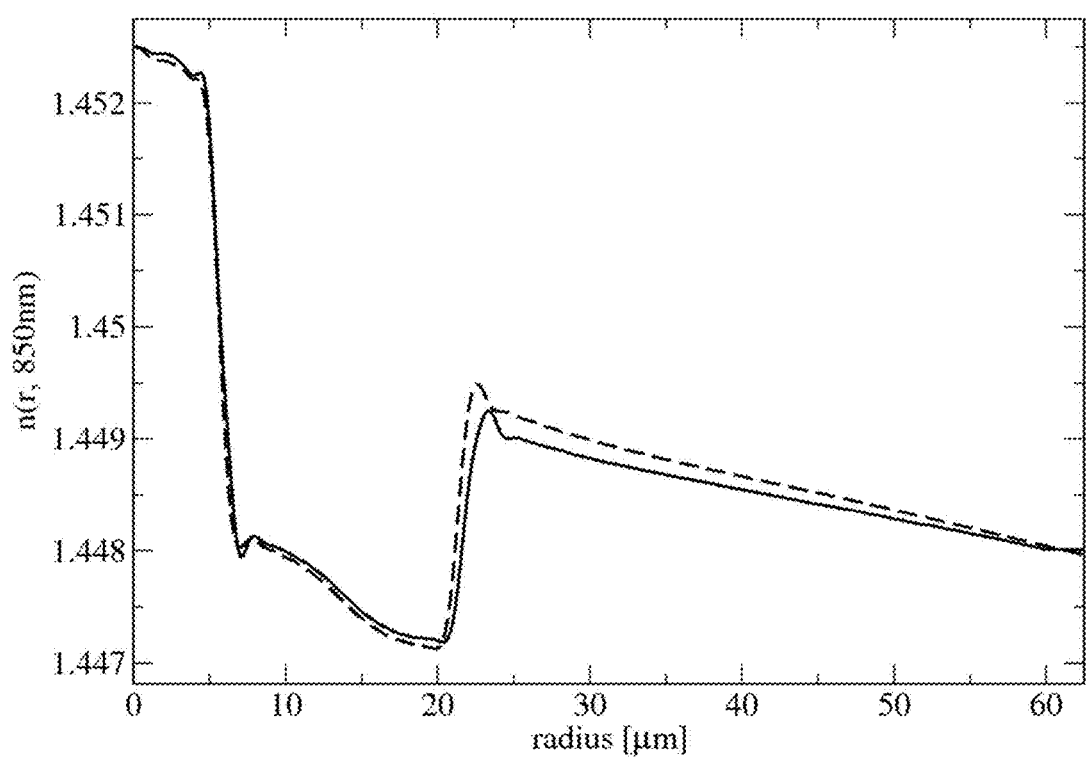
FIG. 5A graphically depicts index versus radius comparative optical fibers of Table 1.
Figure 5B:
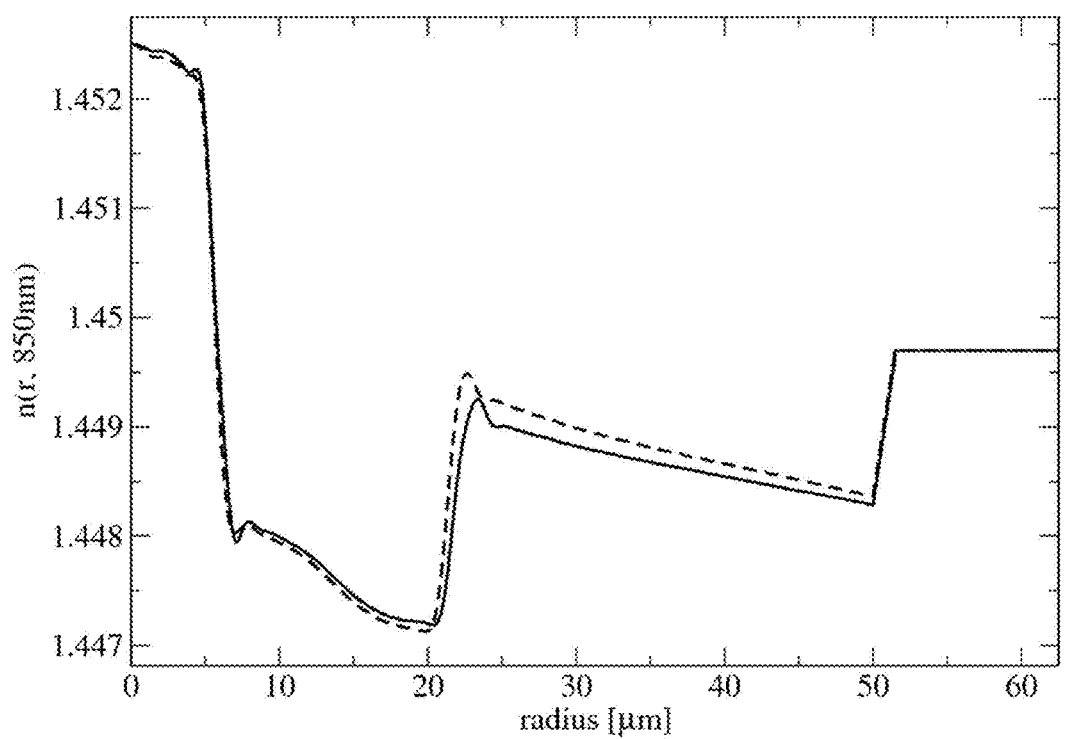
FIG. 5B graphically depicts index versus radius of two embodiments of the optical fibers of Table 1

Tables 1 and 2 disclose modeled examples (Fiber Examples 2 and 4) for the embodiments of optical fibers 100 comprising a silica based core 102, a d a silica based inner cladding 104, a silica based first outer cladding portion 106A and a silica based second outer cladding portion 106B. Fiber Examples 2 and 4 are optical fiber 100 with an outer cladding 106 that includes macrobending relieving layer (cladding portion 106B). That is, optical fibers 100 of Examples 2 and 4 have the stress relieving second outer cladding layer 106B adjacent to the primary coating. The fiber profiles of Example 2 and 4 fibers are illustrated in FIG. 5B. Examples 1 and 3 are comparative fibers that do not have the outer cladding portion 106B adjacent to the primary coating. The fiber profiles of comparative fibers (Example 1 and 3) are illustrated in FIG. 5A. As described herein above, the relative refractive indices of the core 102, the inner cladding 104, and the outer cladding portions 106A and 106B, and the coating layer 108 satisfy the following relationship: $\Delta_{coreMAX} > \Delta_{3A} > \Delta_{2MIN}$, and $\Delta_{3B} > \Delta_{3A}$, $\Delta_{3B} < \Delta_C$. The embodiments of Examples 2 and 4 also satisfy the following inequality $\Delta_C > \Delta_{coreMAX} > \Delta_{3B} > \Delta_{3A} > \Delta_2$ and $1.1\% > \Delta_C - \Delta_{3B} \geq 0.6\%$.

More specifically, Tables 1 shows: (a) exemplary core alpha values (b) the relative refractive index % Δ of each layer, (c) the outer radius of each layer in microns, and specific refractive index delta % correspondent to the radial position of 30 microns, 40 microns, 50 microns, 55 microns, and 60 microns. Table 2 depicts optical parameters corresponding to the four fibers depicted in Table 1.

TABLE 1

Profile parameters (Δ %, and r in μm)

|  | Fiber Example 1 (comparative) | Fiber Example 2 | Fiber Example 3 (comparative) | Fiber Example 4 |
|---|---|---|---|---|
| $\Delta_{0max}$ | 0 | 0 | 0 | 0 |
| $r_0$ | 1.46 | 1.46 | 1.8 | 1.8 |
| $\Delta_{1max}$ | −0.01 | −0.01 | −0.006 | −0.006 |
| $r_1$ | 5.7 | 5.7 | 5.86 | 5.86 |
| Alpha | 15 | 15 | 15 | 15 |
| $\Delta_2$ | −0.332 | −0.332 | −0.33 | −0.33 |
| $r_2$ | 20 | 20 | 20.24 | 20.24 |
| $r_{3A}$ |  | 50 |  | 50 |
| $r_3$ | 62.5 | 62.5 | 62.5 | 62.5 |
| Δ at 30 μm | −0.2426 | −0.2426 | −0.2538 | −0.2538 |
| Δ at 40 μm | −0.2649 | −0.2649 | −0.2731 | −0.2731 |
| Δ at 50 μm | −0.2865 | −0.2857 | −0.2914 | −0.2914 |
| Δ at 55 μm | −0.2971 | −0.1932 | −0.3006 | −0.1932 |
| Δ at 60 μm | −0.3082 | −0.1932 | −0.3104 | −0.1932 |
| $\Delta_{3B}\% - \Delta_{3A}\%$ |  | 0.0925 |  | 0.0925 |
| $\Delta_c - \Delta_{3B}\%$ |  | 0.6502 |  | 0.6502 |
| Coating Index 850 nm in delta % |  | 0.457 |  | 0.457 |

TABLE 2

Modelled Optical Parameters at 1550 nm wavelength

|  | Fiber Example 1 (comparative) | Fiber Example 2 | Fiber Example 3 (comparative) | Fiber Example 4 |
|---|---|---|---|---|
| MFD [μm] | 12.02 | 12.02 | 12.04 | 12.04 |
| $A_{eff}$ [μm$^2$] | 114.59 | 114.59 | 114.97 | 114.97 |
| D [ps/nm-km] | 21.18 | 21.18 | 21.175 | 21.175 |
| Slope [ps/nm$^2$-km] | 0.0609 | 0.0609 | 0.06104 | 0.06104 |
| κ [nm] | 347.8 | 347.8 | 346.9 | 346.9 |
| Attenuation [dB/km] | 0.16 | 0.16 | 0.16 | 0.16 |
| LP$_{11}$ straight fiber cutoff [nm] | 1404 | 1362 | 1471 | 1352 |

The tabulated straight fiber LP$_{11}$ mode cutoff wavelength represents the cutoff value computed based on the longest wavelength beyond which the output power (in dBs) as a function of the wavelength approximates a linear dependence. It is noted that the optical fibers 100 with the raised index outer cladding region 106B directly adjacent to the coating (see, for example Fibers 2 and 4 in Table 2 have significantly shorter fiber cutoff wavelengths than the similar comparative fibers that do not have a raised index outermost cladding portion 106B directly adjacent to the coating (see for example fibers 1 and 3 of Table 2). The embodiments of the optical fibers 100 have macrobend loss<0.03 dB/turn at 50 mm bend diameter, macrobend loss<0.003 dB/turn at 60 mm bend diameter, and macrobend loss of <0.001 dB/turn at 75 mm bend diameter. For example, the macrobend loss at 50 mm bend diameter may be between $10^{-5}$ dB/turn and 0.03 dB/turn. For example, the macrobend loss at 60 mm bend diameter may be between $10^{-5}$ dB/turn and 0.003 dB/turn. For example, the macrobend loss at 75 mm bend diameter may be between 0 dB/turn and or perhaps, or for example between $10^{-5}$ dB/turn and 0.001 dB/turn. In some embodiments the macrobend loss at 50 mm bend diameter is between 0.0005 dB/turn and 0.003 dB/turn, at 60 mm diameter is between 0.0003 dB/turn and 0.003 dB/turn, and at 70 mm diameter is between 0.0001 dB/turn and 0.001 dB/turn.

Some of the fiber embodiments disclosed herein may comprise 540 weight percent germania (e.g., 7-10 weight percent germania in) and 0 to 0.1 weight percent Cl in the core 102 (0.1 weight % in some embodiments), a core radius of 3.5 to 8 microns, a maximum core delta of 0.25 to 0.55%), an inner cladding radius $r_2$ of 13 to 20 microns (e.g., 13 microns in Table 1), a first outer cladding radius $r_{3A}$ of 40 to 55 microns (e.g., 40 to 50 microns, or 40 to 55 microns in embodiments shown Table 1) and a second outer cladding layer radius $r_3$ of 60-65 microns (e.g., 62.5 microns in embodiments shown in Table 1). In some embodiments the first outer cladding layer 106A comprises 0.2 to 1.5 weight percent chlorine (e.g., 0.4 to 1.5%). The second outer cladding layer 106B in some embodiments comprises Cl and/or N from 0 to 0.2 weight percent. The coating index of refraction ($n_c$) for the fibers of Tables 1 and 2 is 1.46.

The examples of fiber embodiments 100 disclosed in Tables 1 and 2 are ITU G.654 standard compliant. The fibers in Tables 1 and 2 have low attenuation at 1550 nm of ≤0.185 dB/km, for example ≤0.18 dB/km, or ≤0.17 dB/km, or 0.158 dB/km to 0.17 dB/km, or 0.16 dB/km to 0.168 dB/km.

It will be apparent to those skilled in the art that various modifications and variations can be made to the embodiments described herein without departing from the spirit and scope of the claimed subject matter. Thus it is intended that the specification cover the modifications and variations of the various embodiments described herein provided such modification and variations come within the scope of the appended claims and their equivalents.

What is claimed is:
1. An optical fiber comprising:
   (i) a core comprising silica and having a maximum relative refractive index delta $\Delta_{coreMAX}$; and LP01 effective area >100 μm² at 1550 nm;
   (ii) an annular inner cladding surrounding the core and having a minimum relative refractive index delta $\Delta_{2MIN}$ and $\Delta_{coreMAX}>\Delta_{2MIN}$;
   (iii) an annular outer cladding surrounding the inner cladding and comprising
   (a) a first outer cladding portion with a maximum refractive index $\Delta_{3A}$ such that $\Delta_{3A}>\Delta_{2MIN}$; and
   (b) another outer cladding portion surrounding the first outer cladding portion with a maximum refractive index delta $\Delta_{3B}$ wherein
   $\Delta_{coreMAX}>\Delta_{3B}>\Delta_{3A}$, said another outer cladding portion being the outermost portion of the outer cladding; and
   (iv) a coating layer surrounding the outer cladding, and in contact with said another outer cladding portion, the coating layer having a relative refractive index delta $\Delta_C$ wherein $\Delta_C>\Delta_{3B}$, wherein, wherein said inner cladding portion is in contact with said core,
   $-0.7\%<\Delta_{2MIN}<-0.2\%$, $3\%>\Delta_C-\Delta_{3B}\geq0.02\%$ and said fiber has macrobend loss <0.03 dB/turn at 50 mm bend diameter, macrobend loss <0.003 dB/turn at 60 mm bend diameter, and macrobend loss of <0.001 dB/turn at 75 mm bend diameter.

2. The optical fiber of claim 1, wherein $-0.55\%<\Delta_{2MIN}<-0.35\%$.

3. An optical fiber comprising:
   (i) a core comprising silica and having a maximum relative refractive index delta $\Delta_{coreMAX}$; and LP01 effective area >100 μm² at 1550 nm;
   (ii) an annular inner cladding surrounding the core and having a minimum relative refractive index delta $\Delta_{2MIN}$, and $\Delta_{coreMAX}>\Delta_{2MIN}$, wherein $-0.7\%<\Delta_{2MIN}<-0.2\%$, measured relative to pure silica;
   (iii) an annular outer cladding surrounding the inner cladding and comprising
   a first outer cladding portion with a maximum refractive index $\Delta_{3A}$ such that $\Delta_{3A}-\Delta_{2MIN}\geq0.02\%$; and
   another outer cladding portion surrounding the first outer cladding portion with a maximum refractive index delta $\Delta_{3B}$ wherein $\Delta_{coreMAX}>\Delta_{3B}$ and $\Delta_{3B}-\Delta_{3A}\geq0.07\%$, said another outer cladding portion being the outermost portion of the outer cladding; and
   (iv) a coating layer surrounding the outer cladding portion, and in contact with said another outer cladding portion, the coating layer having a relative refractive index delta $\Delta_C$ wherein $\Delta_C>\Delta_{3B}$, wherein said fiber has macrobend loss <0.03 dB/turn at 50 mm bend diameter, macrobend loss <0.003 dB/turn at 60 mm bend diameter, and macrobend loss of <0.001 dB/turn at 75 mm bend diameter.

4. The optical fiber of claim 3, wherein the core comprises a maximum relative refractive index, $\Delta_{coreMAX}$ relative to silica, from between −0.05% and 0.5%.

5. The optical fiber of claim 4, wherein the core comprises essentially no germania.

6. The optical fiber of claim 5, wherein the difference between the refractive index delta of the coating layer and said another outer cladding portion is $2.2\%\geq\Delta_C-\Delta_{3B}\geq0.02\%$.

7. The optical fiber of claim 3, wherein the core comprises less than 0.1 weight % germania.

8. The optical fiber of claim 3, wherein the optical fiber has an attenuation of less than or equal to about 0.17 dB/km at a wavelength of 1550 nm.

9. The optical fiber of claim 3, wherein said another outer cladding portion is the second outer cladding portion, and said second outer cladding portion has a radial thickness from greater than or equal to about 2 microns to less than or equal to about 25 microns and is situated in contact with the first outer cladding portion and the coating layer.

10. The optical fiber of claim 3, wherein the core has a radial thickness from greater than or equal to about 3 microns to less than or equal to about 10 microns.

11. The optical fiber of claim 3, wherein the inner cladding has a radial thickness from greater than or equal to about 5 microns.

12. The optical fiber of claim 3, wherein the first outer cladding portion is surrounding the inner cladding, the first outer cladding portion has a relative refractive index $\Delta_{3A}$, and $\Delta_{3A}-\Delta_{2MIN}>0.05\%$.

13. The optical fiber of claim 12, wherein the second outer cladding portion has a radial thickness from greater than or equal to about 2 microns to less than or equal to about 25 microns.

14. The optical fiber of claim 3, wherein the refractive index of the coating is 1.45 to 1.5 at 1550 nm.

15. An optical fiber comprising:
(i) a core comprising silica and having a maximum relative refractive index delta $\Delta_{coreMAX}$; and LP01 effective area >100 μm² at 1550 nm;
(ii) an annular inner cladding surrounding the core and having a minimum relative refractive index delta $\Delta_{2MIN}$, and $\Delta_{coreMAX}>\Delta_{2MIN}$, wherein $-0.7\%<\Delta_{2MIN}<-0.2\%$, measured relative to pure silica;
(iii) an annular outer cladding surrounding the inner cladding and comprising
a first outer cladding portion with a maximum refractive index $\Delta_{3A}$ such that $\Delta_{3A}-\Delta_{2MIN}\geq0.02\%$; and
another outer cladding portion surrounding the first outer cladding portion with a maximum refractive index delta $\Delta_{3B}$ wherein $\Delta_{coreMAX}>\Delta_{3B}$ and $\Delta_{3B}-\Delta_{3A}\geq0.07\%$, said another outer cladding portion being the outermost portion of the outer cladding; and
(iv) a coating layer surrounding the outer cladding portion, and in contact with said another outer cladding portion, the coating layer having a relative refractive index delta $\Delta_C$ wherein $\Delta_C>\Delta_{3B}$, wherein the optical fiber has dispersion less than or equal to about 23 ps/nm·km at a wavelength of 1550 nm.

16. An optical fiber comprising:
(i) a core comprising silica and having a maximum relative refractive index delta $\Delta_{coreMAX}$; and LP01 effective area >100 μm² at 1550 nm;
(ii) an annular inner cladding surrounding the core and having a minimum relative refractive index delta $\Delta_{2MIN}$, and $\Delta_{coreMAX}>\Delta_{2MIN}$, wherein $-0.7\%<\Delta_{2MIN}<-0.2\%$, measured relative to pure silica;
(iii) an annular outer cladding surrounding the inner cladding and comprising
a first outer cladding portion with a maximum refractive index $\Delta_{3A}$ such that $\Delta_{3A}-\Delta_{2MIN}\geq0.02\%$; and
another outer cladding portion surrounding the first outer cladding portion with a maximum refractive index delta $\Delta_{3B}$ wherein $\Delta_{coreMAX}>\Delta_{3B}$ and $\Delta_{3B}-\Delta_{3A}\geq0.07\%$, said another outer cladding portion being the outermost portion of the outer cladding; and
(iv) a coating layer surrounding the outer cladding portion, and in contact with said another outer cladding portion, the coating layer having a relative refractive index delta $\Delta_C$ wherein $\Delta_C>\Delta_{3B}$, wherein the optical fiber is a single mode optical fiber and has cable cutoff <1530 nm.

17. An optical fiber comprising:
(i) a core comprising silica and having a maximum relative refractive index delta $\Delta_{coreMAX}$; and LP01 effective area >100 μm² at 1550 nm;
(ii) an annular inner cladding surrounding the core and having a minimum relative refractive index delta $\Delta_{2MIN}$, and $\Delta_{coreMAX}>\Delta_{2MIN}$, wherein $-0.7\%<\Delta_{2MIN}<-0.2\%$, measured relative to pure silica;
(iii) an annular outer cladding surrounding the inner cladding and comprising
a first outer cladding portion with a maximum refractive index $\Delta_{3A}$ such that $\Delta_{3A}-\Delta_{2MIN}\geq0.02\%$; and
another outer cladding portion surrounding the first outer cladding portion with a maximum refractive index delta $\Delta_{3B}$ wherein $\Delta_{coreMAX}>\Delta_{3B}$ and $\Delta_{3B}-\Delta_{3A}\geq0.07\%$, said another outer cladding portion being the outermost portion of the outer cladding; and
(iv) a coating layer surrounding the outer cladding portion, and in contact with said another outer cladding portion, the coating layer having a relative refractive index delta $\Delta_C$ wherein $\Delta_C>\Delta_{3B}$, wherein the difference between the refractive index delta of the coating layer and said another outer cladding portion is $0.9\%>\Delta_C-\Delta_{3B}\geq0.5\%$.

18. The optical fiber of claim 17, wherein said fiber has macrobend loss <0.03 dB/turn at 50 mm bend diameter, macrobend loss <0.003 dB/turn at 60 mm bend diameter, and macrobend loss of <0.001 dB/turn at 75 mm bend diameter.

19. The optical fiber of claim 17, wherein the difference between the refractive index delta of the coating layer and said another outer cladding portion is $0.85\%\geq\Delta_C-\Delta_{3B}\geq0.6\%$.

20. An optical fiber comprising:
(i) a core comprising silica and having a maximum relative refractive index delta $\Delta_{coreMAX}$ from between -0.05% and 0.5%; and LP01 effective area >100 μm² at 1550 nm;
(ii) an annular inner cladding surrounding the core and having a minimum relative refractive index delta $\Delta_{2MIN}$, and $\Delta_{coreMAX}>\Delta_{2MIN}$, wherein $-0.7\%<\Delta_{2MIN}<-0.2\%$, measured relative to pure silica;
(iii) an annular outer cladding surrounding the inner cladding and comprising
a first outer cladding portion with a maximum refractive index $\Delta_{3A}$ such that $\Delta_{3A}-\Delta_{2MIN}\geq0.02\%$; and
another outer cladding portion surrounding the first outer cladding portion with a maximum refractive index delta $\Delta_{3B}$ wherein $\Delta_{coreMAX}>\Delta_{3B}$ and $\Delta_{3B}-\Delta_{3A}\geq0.07\%$, said another outer cladding portion being the outermost portion of the outer cladding; and
(iv) a coating layer surrounding the outer cladding portion, and in contact with said another outer cladding portion, the coating layer having a relative refractive index delta $\Delta_C$ wherein $\Delta_C>\Delta_{3B}$, wherein the difference between the refractive index delta of the coating layer and said another outer cladding portion is $1.5\%>\Delta_C-\Delta_{3B}\geq0.5\%$; and the difference between the refractive index delta of the another outer cladding portion and said first outer cladding portion is $1.0\%>\Delta_{3B}-\Delta_{3A}\geq0.05\%$.

21. An optical fiber comprising:
(i) a core comprising silica and having a maximum relative refractive index delta $\Delta_{coreMAX}$; and LP01 effective area >100 μm² at 1550 nm;
(ii) an annular inner cladding surrounding the core and having a minimum relative refractive index delta $\Delta_{2MIN}$, and $\Delta_{coreMAX}>\Delta_{2MIN}$, wherein $-0.7\%<\Delta_{2MIN}<-0.2\%$, measured relative to pure silica;
(iii) an annular outer cladding surrounding the inner cladding and comprising
a first outer cladding portion with a maximum refractive index $\Delta_{3A}$ such that $\Delta_{3A}-\Delta_{2MIN}\geq0.02\%$; and another outer cladding portion surrounding the first outer cladding portion with a maximum refractive index delta $\Delta_{3B}$ wherein $\Delta_{coreMAX} > \Delta_{3B}$ and $\Delta_{3B} - \Delta_{3A} \geq 0.07\%$, said another outer cladding portion being the outermost portion of the outer cladding; and (iv) a coating layer surrounding the outer cladding portion, and in contact with said another outer cladding portion, the coating layer having a relative refractive index delta $\Delta_C$ wherein $\Delta_C > \Delta_{3B}$, wherein the core comprises a maximum relative refractive index, $\Delta_{coreMAX}$ relative to silica, from between $-0.05\%$ and $0.5\%$ and essentially no germania, and the refractive index of the coating layer is 1.45 to 1.51 at 1550 nm and wherein $\Delta_C - \Delta_{3B} \geq 0.5\%$; and the difference between the refractive index delta of the another outer cladding portion and said first outer cladding portion is $1.0\% \geq \Delta_{3B} - \Delta_{3A} \geq 0.05\%$.

* * * * *

UNITED STATES PATENT AND TRADEMARK OFFICE
CERTIFICATE OF CORRECTION

PATENT NO. : 9,874,686 B2
APPLICATION NO. : 15/166772
DATED : January 23, 2018
INVENTOR(S) : Snigdharaj Kumar Mishra et al.

It is certified that error appears in the above-identified patent and that said Letters Patent is hereby corrected as shown below:

On the Title Page

Page 2, Column 1, item [56], Line 8, delete "Electonics" and insert -- Electronics --, therefor.

Page 2, Column 1, item [56], Line 9, delete "Imrpoved" and insert -- Improved --, therefor.

Signed and Sealed this
Fourth Day of October, 2022

Katherine Kelly Vidal
*Director of the United States Patent and Trademark Office*